April 21, 1959 R. V. ORR 2,883,537
RADIOSONDE TRANSMITTER
Filed Oct. 14, 1954 7 Sheets-Sheet 2

INVENTOR
Robert V. Orr.
BY
K. J. Doub
ATTORNEY

INVENTOR
Robert V. Orr.
BY
ATTORNEY

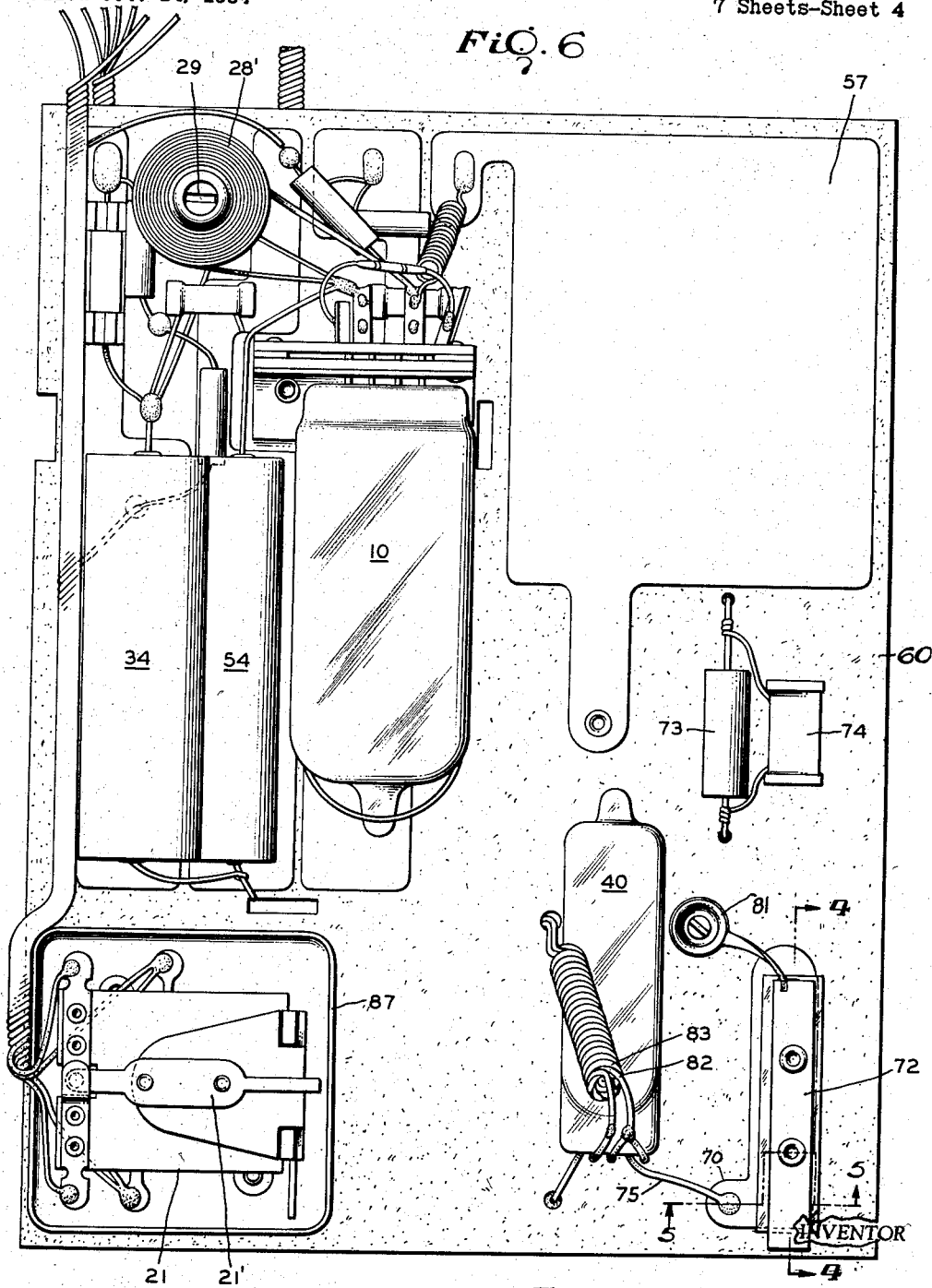

INVENTOR
Robert V. Orr.
BY
ATTORNEY

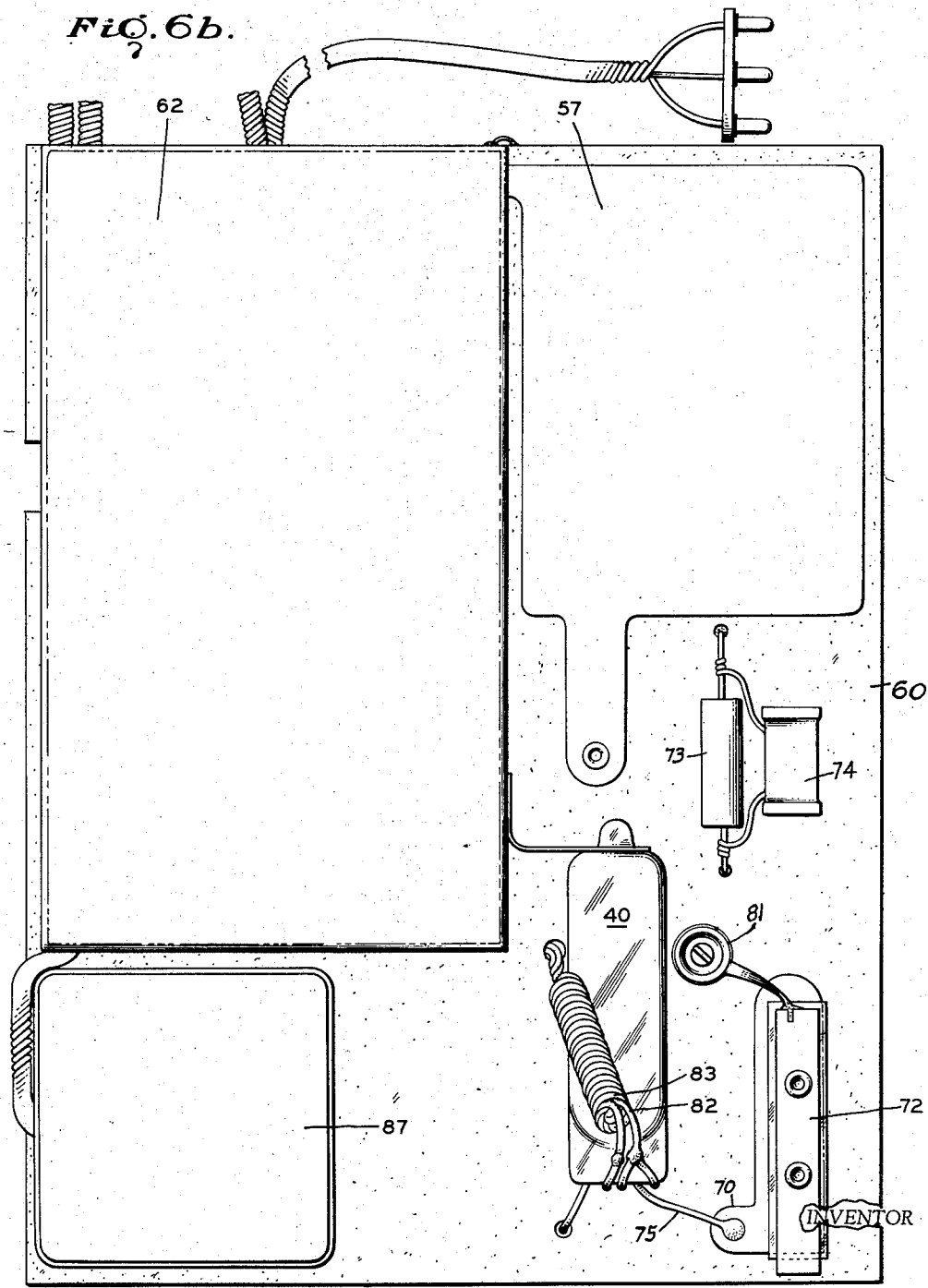

April 21, 1959        R. V. ORR        2,883,537
RADIOSONDE TRANSMITTER

Filed Oct. 14, 1954        7 Sheets-Sheet 7

INVENTOR
Robert V. Orr.
BY
ATTORNEY

United States Patent Office 2,883,537
Patented Apr. 21, 1959

2,883,537

RADIOSONDE TRANSMITTER

Robert V. Orr, Baltimore, Md., assignor to Bendix Aviation Corporation, Baltimore, Md., a corporation of Delaware Application October 14, 1954, Serial No. 462,192

2 Claims. (Cl. 250—36)

The use of telemetering equipment for investigating upper-air conditions, including pressure, temperature and relative humidity, has become so widespread as to require mass production of certain items of such equipment at a relatively low cost without the sacrifice of efficiency while at the same time meeting specifications as to size and weight and the use of transmitters capable of generating ultra high frequency carrier waves. The unit sent aloft usually comprises a radio transmitter incorporating a radio frequency oscillator coupled to a suitable antenna and adapted to be modulated in accordance with the relaxation frequency of a second oscillator whose relaxation rate is determined as a function of the conditions being measured. Since only a certain percentage of these units are recovered, or if recovered are in a state justifying reconditioning, they are to a large extent considered expendable, which fact tends to place increasing emphasis on low cost.

An object of the instant invention, therefore, is to provide an efficient ultra high frequency radio transmitter for use in air-borne telemetering apparatus which is of reduced size and weight with respect to known transmitters and which at the same time may be economically manufactured on a mass production basis.

Another object is to improve the electrical and mechanical stability of transmitters of the type specified, and particularly the carrier or radio frequency oscillator section thereof. By "electrical stability" is meant freedom from interference and signal fade-out due to the action of external electrical fields, either coupled electrostatically to circuit components or conducted into the oscillator circuit by way of external connections; and by "mechanical stability" is meant the ability of the components and their electrical connections to withstand vibration and shock without disrupting the circuitry or the precalibrated condition of the transmitter.

Another object is to improve the modulating action of the relaxation oscillator and provide a more uniform waveform for modulating the carrier frequency.

Another object is to utilize etched metallic circuitry and an associated base material in a transmitter having a radio frequency oscillator of improved design adapted to generate an ultra high frequency carrier wave (300 to 3000 megacycles), modulated in accordance with the relaxation oscillation frequency of a relaxation oscillator of the type illustrated and described in the patent to J. R. Cosby, No. 2,558,342, to obtain, among other advantages, reduction in weight, simplicity in assembling and wiring and a consequent reduction in manufacturing costs, and more efficient radio-frequency by-passing with consequent improved signal transmission.

A further object is to provide a radio transmitter for air-borne telemetering apparatus wherein all the components are arranged compactly on a single flat, rigid base of phenolic or like material adapted for etched circuitry surfacing, said base functioning both as a support and a dielectric.

The foregoing and other objects and advantages will become apparent in view of the following description taken in conjunction with the drawings, wherein.

Figure 1:
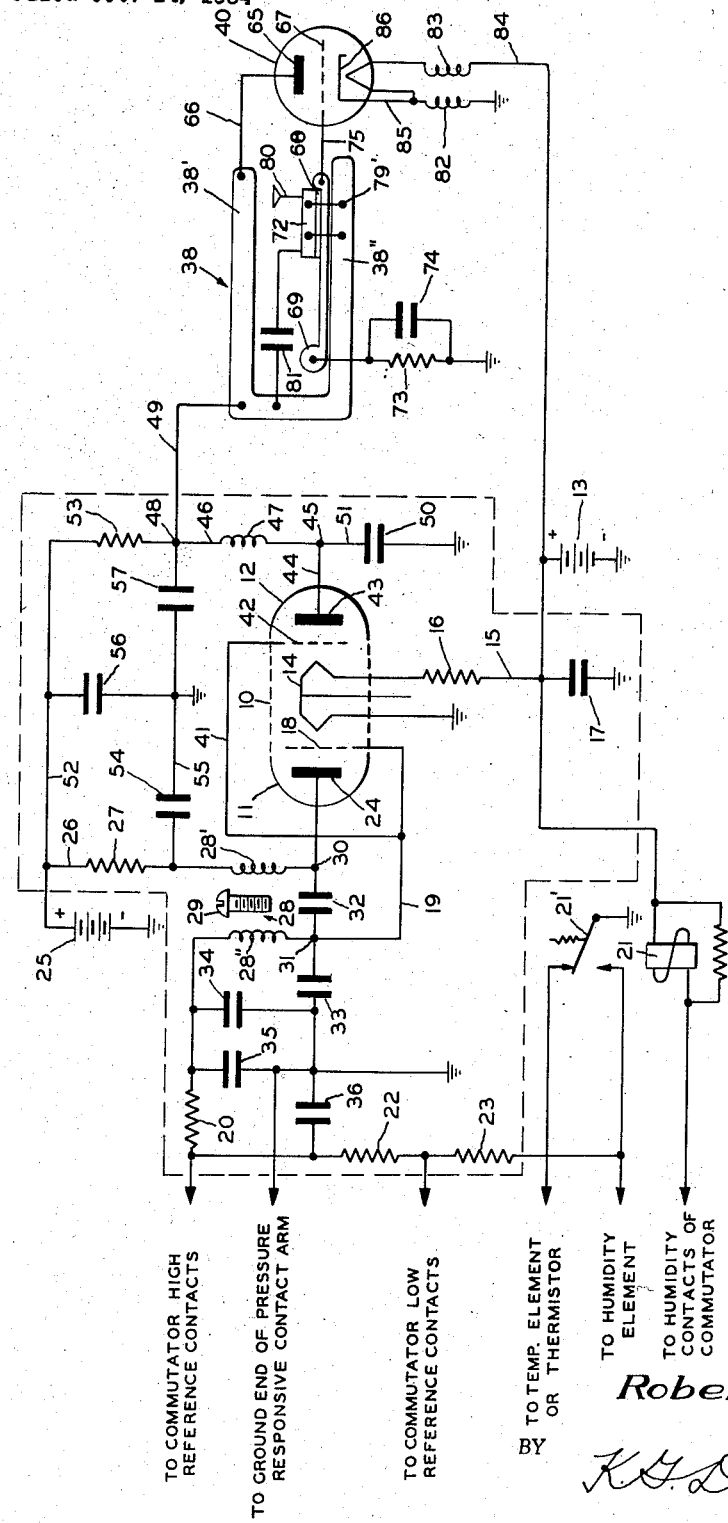
Fig. 1 is an electrical diagram of a radio transmitter in accordance with the invention.
Figure 6A:
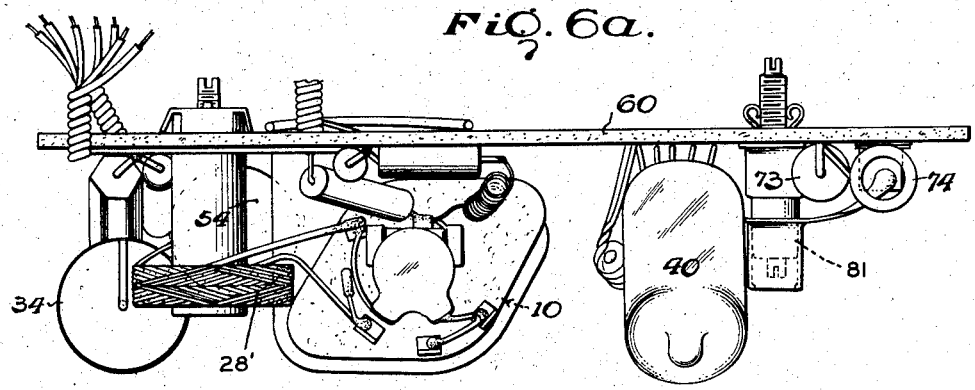
Fig. 6 is a plan view (enlarged approximately twice actual size) of the component-mounting side of the assembled transmitter, with the audio section shield and relay dust cover removed.
Figure 8:
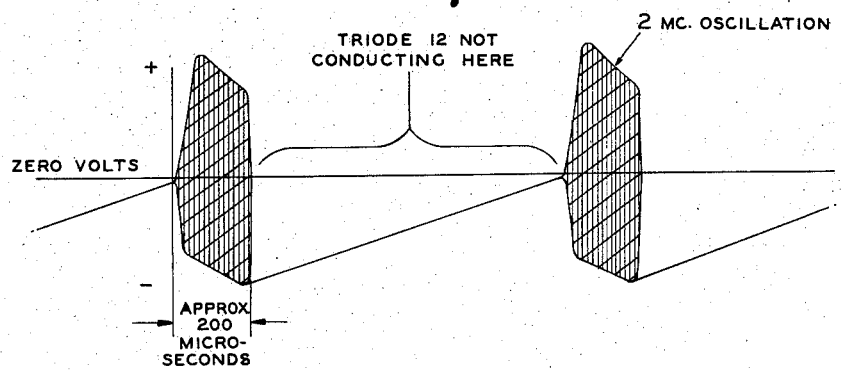
Figure 8A:
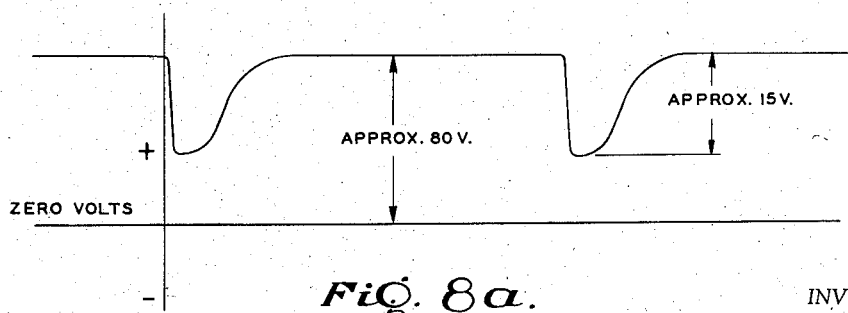
Figure 7:
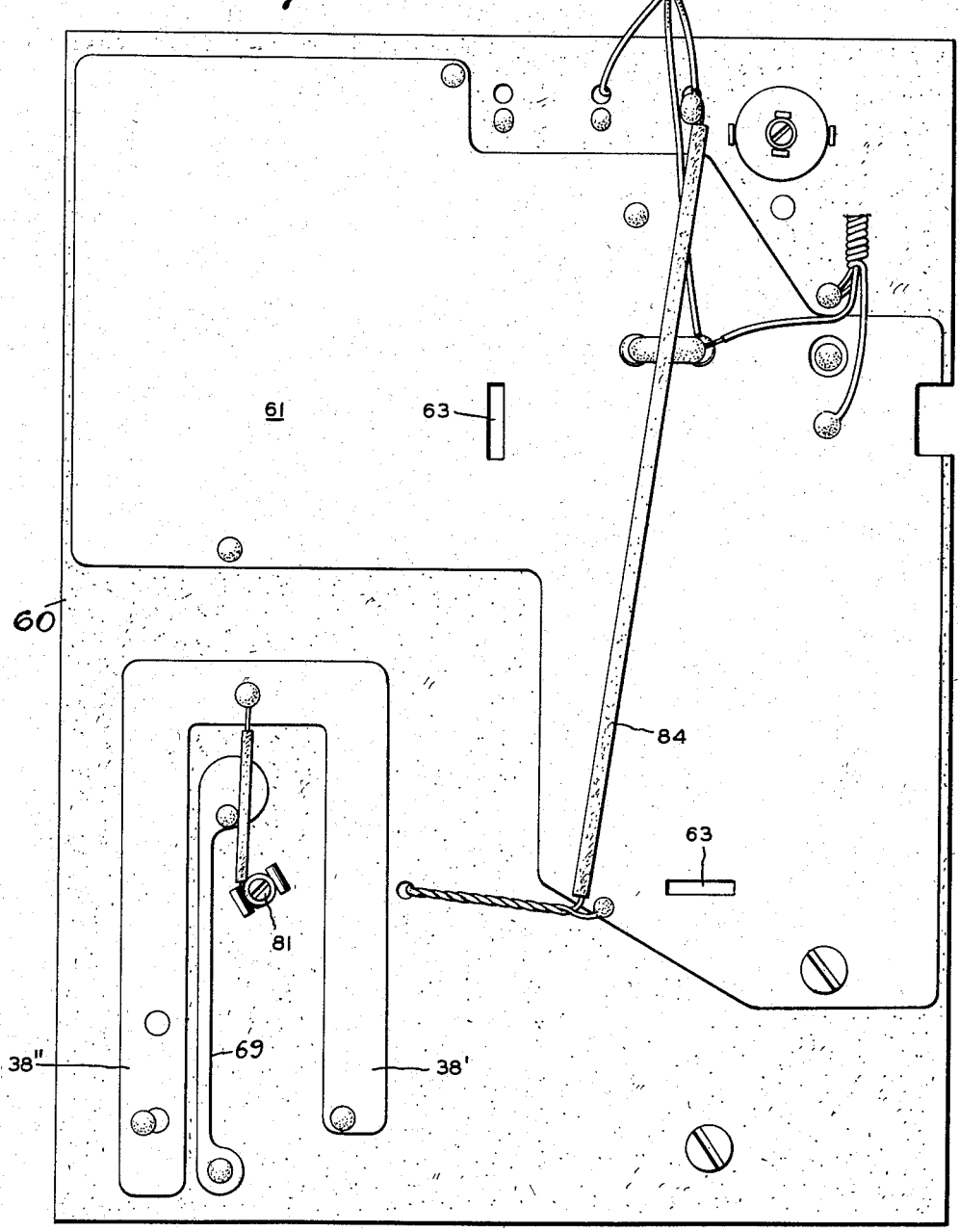

Fig. 6–A is a view in end elevation of Fig. 6;

Fig. 6–B is a view similar to Fig. 6, with the said shield and cover on;

Fig. 7 is a plan view of the ground side of the assembled transmitter, or the side opposite to that shown in Fig. 6;

Figs. 8 and 8–A are waveform diagrams, Fig. 8 illustrating the waveform developed at grids 18 and 42, Fig. 1, by the relaxation oscillator, and Fig. 8–A illustrating the modulation pulses at anode 43 which are permitted to pass to the aerial tank circuit or transmission line.

Referring to Fig. 1, the transmitter shown therein employs a relaxation oscillator and associated measuring circuitry which, from an operational standpoint, is generally similar to that of the Cosby Patent No. 2,558,-342, heretofore noted. As is well known by those having a knowledge of the art, the transmitter may be carried aloft by a free balloon, or it may be released at a high altitude from an aircraft, and while in transit, meteorologically-sensitive elements vary the rate of audio frequency modulation of the transmitted carrier wave in accordance with the temperature, pressure and humidity of the surrounding atmosphere. The transmitted wave in the present instance is a radio frequency carrier having a frequency of 403 megacycles per second, modulated at an audio frequency in the range of from zero to 200 cycles per second by a relaxation oscillator triode and a buffer amplifier triode. These frequencies are a matter of choice, however, and may be selected to suit conditions or to meet specifications. The oscillations whose modulations transmit signals representative of pressure, temperature and humidity to a suitable receiver located at a ground station are generated in one triode section 11 of a thermionic vacuum tube 10, said tube also enclosing a buffer triode 12. Tube 10 may be of that type commercially designated as 3A5. The filament power for the dual triode 10 may be obtained from a seven-volt "A" battery 13, which is connected to dual filament 14 by way of conductor 15, having dropping resistor 16 therein. Capacitor 17, which may have a value of 30 mmfd., serves to shunt high frequency currents from the filament circuit.

The direct current circuit between grid 18 and ground is completed by way of conductor 19 across resistor 20 and, depending upon the contact position of grounded relay switch arm 21' which is controlled by relay coil 21, thence across a temperature-responsive element or resistor, not shown, or a humidity element or resistor, also not shown. As the transmitter gains altitude, the grounded contact arm of a barometric switch sweeps successively across the contact segments of a commutator, not shown, intermittently grounding and ungrounding one terminal of the relay coil 21. When coil 21 is energized, arm 21' grounds one terminal of the humidity strip or resistor, thereby completing the grid circuit through said strip; and when said coil is deenergized, the said circuit is completed through the temperature-sensitive element. At intervals a ground is completed either from the low voltage end or high voltage end of a resistor 22, to provide high and low reference frequencies for calibration purposes. The resistor 23 provides a shunt for the humidity element to ensure continued operation of the relaxation oscillator when said element assumes extremely high values of resistance as a result of being subjected to low relative humidities at very low temperatures.

The anode 24 of the blocking oscillator triode 11 is supplied with a potential of approximately 65 volts from the positive terminal of "B" battery 25 by way of conductor 26, having a dropping resistor 27 therein. The anode and grid circuits of the triode 11 are connected in positive feed-back relationship to generate oscillations in an auxiliary frequency oscillation transformer, generally indicated at 28, and comprising plate inductor or coil 28' and grid coil 28". The screw indicated at 29 constitutes an adjustable core for the transformer 28, and serves, among other functions, as a means for standardizing the grid current flow in the relaxation oscillator grid circuit. For a detail analysis of the functions and operation of the member 29, reference may be had to the Cosby Patent No. 2,558,342. The anode and grid terminals 30 and 31 are also bridged by a decoupling capacitor 32, which may have a value of 100 mmfd., and grid terminal 31 is connected to ground through radio frequency shunt capacitor 33, which may have a value of 100 mmfd.

The direct current resistance path from grid 18 to ground by way of resistor 20 and the condition-sensing elements in series therewith is shunted by a blocking capacitor 34, which may have a nominal value of 0.08 mfd. In parallel with capacitor 34 is a radio frequency shunt capacitor 35, which may have a value of 100 mmfd. Capacitor 36 also serves as a high frequency shunt capacitor and may have a value of 100 mmfd.

As will be understood by those having a knowledge of blocking oscillators, the oscillations in coils 28' and 28" increase in magnitude to a point causing the flow of grid current between grid 18 and cathode 14 to develop a negative charge on the ungrounded electrode of capacitor 34; and when this negative charge obtains a certain value, the amplifying action of the relaxation oscillator section 11 of tube 10 is determined, whereupon oscillations cease and the flow of charging current to the capacitor stops. Capacitor 34 now discharges through the associated resistance network until the grid bias assumes a value such that oscillatory conditions are re-established, whereupon the cycle is repeated.

The circuitry so far described conforms substantially to that of the relaxation oscillator and associated condition-sensing resistance network of the Cosby Patent No. 2,558,342, and the instant invention involves this part of the transmitter only insofar as the adaptation of the same to etched or printed circuitry is concerned and its coaction with other parts of the transmitter to produce a complete operative device of relatively light weight and low cost manufacture. From this point on, the description deals with circuitry which, while designed to obtain the same end results as the transmitter of the Cosby patent, departs therefrom in certain respects with the object of not only adapting the circuitry to the etching or printing process but to also improve the efficiency of the transmitter.

The triode 12 functions as a buffer amplifier between the blocking oscillator triode 11 and a radio or carrier frequency oscillator, generally indicated at 40. The oscillator waveform developed in triode 11 is applied to triode 12 by means of a direct circuit connection 41 between grid 18 and grid 42. Plate or anode 43 of triode 12 is connected to a quarter-wave tuned resonant transmission line or tank circuit 38, to be described, by way of conductor 44, terminal 45, conductor 46 having inductor 47 therein, terminal 48 and conductor 49. Inductor 47 serves to isolate the high frequency currents generated by the carrier oscillator 40 from the buffer amplifier 12. A capacitor 50 is connected in line 51, from the buffer amplifier to ground, to shunt the relaxation oscillator frequency currents and provide a more uniform waveform for modulation of the carrier frequency; it may have a value of 2,000 mmfd. The function of this capacitor will be more fully hereinafter explained.

An anode potential of approximately 90 volts is applied to the plate 43 of the buffer triode 12 by way of line wire or conductor 52, resistor 53, and conductors 46, 44. During periods when the grid 18 of triode 11 is biased negatively such that the triode is in a non-conducting state, triode 12 is in a like condition or state of non-conduction due to the direct connection between grids 18 and 42. During periods when the blocking oscillator triode 11 is conducting due to the relaxation oscillations, triode 12 conducts current and produces a voltage drop across resistor 53, which also functions as an anode load resistor for the carrier frequency oscillator triode 40. This resistor may have a value of approximately 470 ohms. The circuit associated with triode 40 is arranged in a manner such that the triode operates in a state of continuous oscillation at a nominal frequency of 403 megacycles per second. Triode 40 draws a current of from 17 to 25 milliamperes, producing a potential drop of from 6 to 11 volts across resistor 53. When a current pulse passes through resistor 53 due to conduction of triode 12, the anode potential of triode 40 is lowered by approximately 10 volts for the duration of the modulation pulse. Thus, the buffer amplifier triode 12 operates to vary the anode potential of the carrier frequency triode 40 in accordance with the output of the blocking oscillator. The oscillation frequency of triode 40 is determined by the fixed inductance and capacitance of the resonant circuit, by the internal inter-electrode capacitances of the triode and by the electron transit time within the tube. Transit time is affected by changes in anode voltage, i.e., as anode voltage increases, electron velocity increases, and subsequently transit time decreases, producing an increase in carrier frequency. Therefore, the negative anode voltage modulation which buffer amplifier triode 12 applies to the carrier oscillator tank circuit results in frequency deviations in the negative direction, or to a lower frequency. Typical values for this deviation lie in the region from 200 to 600 kilocycles per second.

Capacitor 54 is inserted in ground line or conductor 55 to shunt audio frequency currents from the anode power supply; it may have a value of 0.07 mfd. Capacitors 56 and 57 also serve to short circuit to ground high frequency currents evolving from the carrier oscillator; they may have values of 30 and 100 mmfd., respectively.

At this point it may be well to explain more fully the function of the capacitor 50; also the inductor 47. During the time the relaxtion oscillator is charging the condensere 34, the triode 11 is oscillating at say 2 million cycles per second, note the waveform illustrated in Fig. 8. Since the grid 18 has a direct connection with the grid 42, the triode 12 tends to feed these radio frequency oscillations through to the tank circuit 38, and this would distort the waveform developed by the carrier frequency oscillator 40 in an undesirable manner. However, the capacitor 50 is of a value such as to shunt these frequencies to ground and therefore eliminate them from the tank circuit. Hence the carrier frequency is modulated only by the envelope of the 2 megacycle signal. The rate at which this 2 megacycle signal occurs is determined by the resistance network having therein the ele- elements whose resistances vary as a function of the conditions under observation. On the other hand, it is desirable to isolate the 400 megacycle carrier frequencies developed by the triode 40 and its associated circuitry from the relaxation oscillator circuit, including the buffer triode 12, and this function is performed by the choke or inductor coil 47.

*Etched circuitry development including description of carrier oscillator section of transmitter*

Figure 2:
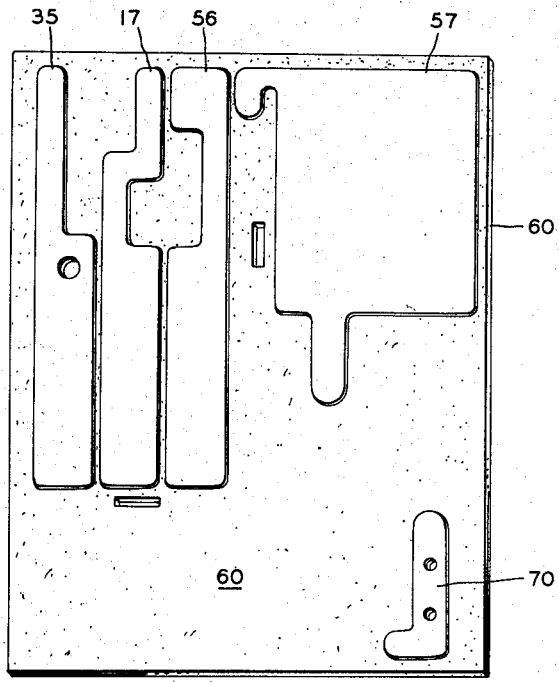
Fig. 2 is a life-size surface view, slightly tilted into perspective, of the component-mounting side of the transmitter base plate or chassis after the latter has been subjected to the etched circuit process.
Figure 3:
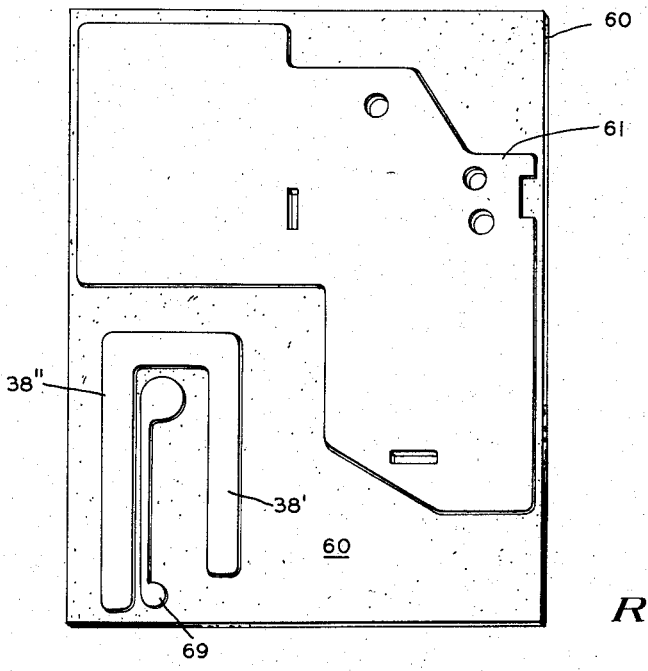
Fig. 3 is a view similar to Fig. 2 but showing the reverse, or what may be considered the ground side of the said plate or chassis.
Figure 5:
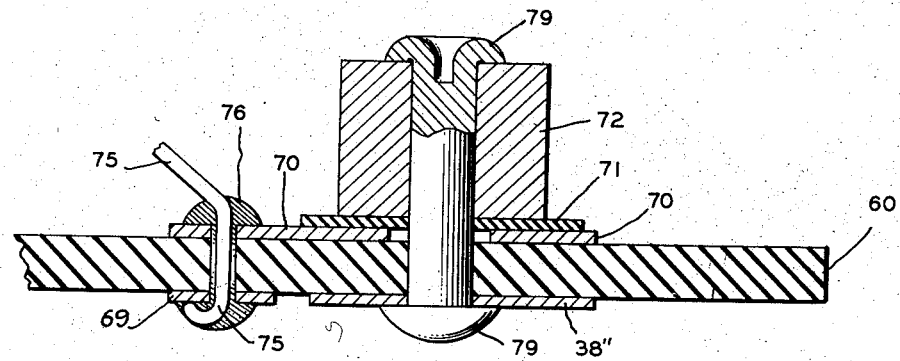
Fig. 5 is a transverse cross-section of the antenna bracket and associated parts (also enlarged in about the same ratio as Fig. 4) taken substantially on the line 5—5, Fig. 6.
Figure 4:
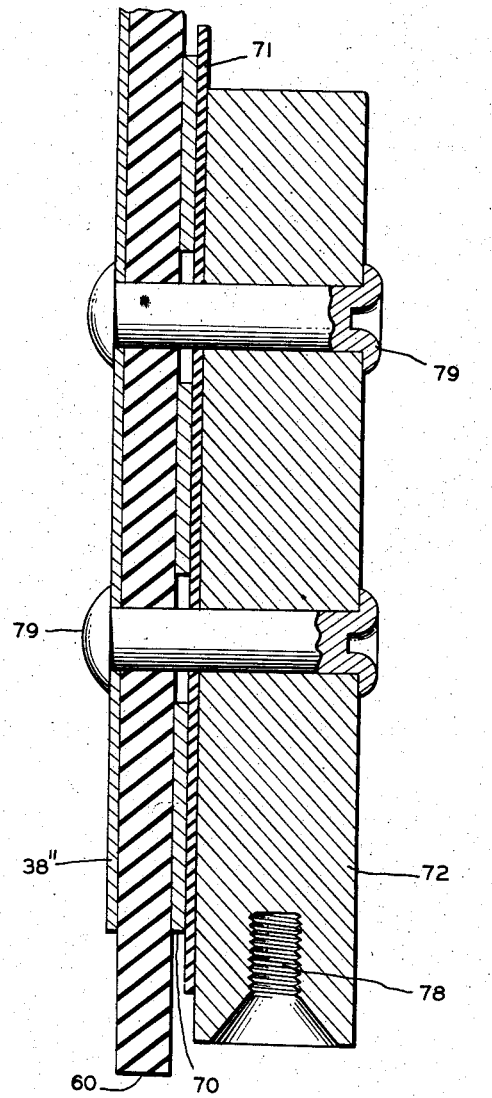
Fig. 4 is detail longitudinal cross-section (enlarged about six times actual size) of an antenna bracket and associated parts, the view being taken substantially on the line 4—4, Fig. 6.

The transmitter circuit as a whole contains five capacitors and an aerial tank circuit which are formed partly or entirely of etched conducting surface matereial separated by a base plate which functions both as a rigid support and as a dielectric. Copper on a phenolic base has been used successfully although other materials may be found more suitable. Since the instant invention is not concerned with the etching process, the latter will not be described in detail. However, for the sake of illustration, the base, generally indicated at 60 in Figs. 2 to 7, inclusive, is made up of a laminated paper-base phenolic having a thickness of approximately one-sixteenth of an inch with copper sheet bonded to opposite surfaces thereof having a thickness of approximately 0.0025 inch. It will at once be obvious that the cross-sectional views in Figs. 4 and 5 are greatly enlarged. From the standpoint of surface area, Figs. 2 and 3 are of actual size, while Figs. 6, 6–A, 6–B and 7 have been enlarged twice actual size. After the etching process is completed, a thin film of lacquer is applied to both surfaces of the base plate, to reduce moisture-absorption and eliminate copper erosion.

Four of the five capacitors above referred to have been previously described in connection with the transmitter of Fig. 1. These are indicated at 17, 35, 56 and 57, and in Fig. 2 the areas indicated by like reference numerals represent the positive plates of these capacitors. The copper areas are so placed as to be opposite and parallel to a large common copper grounding area 61, note Fig. 3. In this manner, the respective copper areas on both sides of the base plate 60 form parallel capacitor plates with one side common. The large "ground plane" area 61 serves as a common return for all currents and also functions as one part of an electrostatic shield, the other part of said shield being in the form of a metal cover 62, refer to Fig. 6–B, which is applied over the assembled parts of the modulator section of the transmitter and has a series of lugs projected through slots 63, Fig. 6, in the base plate, which are turned over against the grounded area 61. Preferably, the lugs are connected by means of solder to the ground plane at three points. In this manner, the cover 62 coacts with the ground area or plane to provide a complete enclosure for those parts which require shielding. By utilizing the phenolic base material as a dielectric and spacing the upper plate areas at about 0.055 of an inch, approximately 25 mmfd. are developed for every square inch of effective capacitor plate area. In order to provide a fair degree of stability for the blocking oscillator, it must be free of the action of external electrical fields, either coupled electrostatically to circuit components, or conducted into the oscillator circuit from external connections. The principal source of external electric fields is the carrier oscillator triode 40 and its associated circuit and the antenna or tank circuit coupled thereto. As heretofore noted the capacitors 17, 35, 56 and 57, provided in part by the copper areas in Fig. 4, serve to remove and short circuit to ground high frequency currents evolving from the carrier oscillator.

The remaining capacitors which have previously been described in connection with Fig. 1, are wired into the circuit and are given corresponding reference numerals in Figs. 6, 6–A, and 6–B.

All portions of the audio modulator section that require stable ground reference points are connected to the common ground plane 61.

Referring now to the carrier oscillator section of the transmitter and particularly to the tank circuit into which it discharges, the manner in which the latter is formed is best illustrated in Figs. 2 and 3 taken in conjunction with Fig. 1. The area 38' represents the principal part of a quarter-wave shorted section of a transmission line. This line has properties such that it presents to triode 40 a high impedance at the frequency of 403 megacycles per second. The anode 65 of the tube 40 is connected to one side of the transmission line by conductor 66, the other side of said line being coupled to the grid 67 of said triode by means of a capacitor generally indicated at 68 in Fig. 1, and which is made up of the copper areas 69 and 70 (compare Fig. 3 with Fig. 2), the mica spacer or dielectric 71, best shown in Fig. 5, and antenna block 72. The capacitor 68 may have a nominal value of 70 mmfd.

Positive feedback to provide oscillation is achieved by magnetic coupling from one side of the resonant transmission line to the other. It should be noted that the physical length of the quarter-wave line 38 is shorter than a quarter-wave length for 403 megacycles per second in free space. This condition arises from the fact that, first, there exists within triode 40 certain interelectrode capacitances which, though small, are large in comparison to the total shunt capacitance of the resonant line, and, secondly, there are certain stray and circuit capacitances which also serve to electrically lengthen the line. Any capacitance, not a natural part of a quarter-wave line, when connected across its open ends, will tend to lengthen this line electrically and reduce its resonant frequency. Since triode 40 operates in a state of continuous wave oscillation, a certain amount of self-bias is generated as a result of grid current flowing through resistor 73 to ground. It was found desirable to provide a path for this grid current to pass from the grid 67 of triode 40 to ground without disturbing the feedback voltage at the high frequency used, and it was desired to lead off this grid current at a point in the resonant circuit which was at a low alternating current potential with respect to ground. This was accomplished by providing a copper area 69 along the grid side 38" of the resonant line 38 until it obtained an alternating current potential sufficiently low to allow the grid resistor 73 to be connected directly to ground. This arrangement is best illustrated in Figs. 1 and 3. The capacitor 74 in parallel with the resistor 73 in Fig. 1 short circuits to ground any high frequency current which may appear at this point; it may have a capacity of 100 mmfd.

The resonant circuit provided by the copper areas 38' and 38" has an effective "Q" value which has been found to be 95% of that of an equivalent circuit made up of silver-plated round copper conductors. The conductor size in area 38' and 38" is 0.0027 of an inch thick and 0.250 of an inch wide. The value of capacitor 68 is such that at the frequency of 403 megacycles per second, the grid connection 75 and 70 is effectively shorted to the grid side of the resonant line 38. The grid line or conductor 75, note Fig. 5, is connected by means of solder 76 to the adjacent end of the copper area 69. Figs. 4 and 5 show the mechanical details of the capacitor 68 in connection with the antenna bracket 72, the latter being in the form of a small elongated bar which is connected to the grid side 38" of the resonant line 38 by means of rivets 79, and these same rivets also bind the capacitor assembly together. The antenna block is provided with a screw-threaded socket 78 to receive an antenna rod 80. In Fig. 1 the rivets are indicated as conductors 79'. A tuning capacitor 81 is connected between the center of the transmission line and the capacitor 68; it may have a value of 0.3 to 3 mmfd. This adjustable connection shunts approximately one-fourth of the tuned circuit and provides the necessary frequency adjustment without any appreciable absorption of radio frequency power. It should be noted that the half-wave antenna is connected to the carrier frequency oscillator at a point which is at the same alternating current potential as the grid 67 of the triode 40 but at a direct current potential of the anode 65 of said triode.

The inductors 82 and 83, connected in series with the filament and cathode leads 84 and 85, respectively (revert to Fig. 1), provide, first, to isolate the major portion of the high frequency currents from the filament battery 13 and the filament of triodes 11 and 12, and, secondly, provide the proper phase of feedback voltage existing between the cathode 86 and grid 67 of the tube 40 in order to maintain an efficient and stable oscillation.

The triode 40 operates as a continuous wave oscillator with an anode voltage of approximately 80 volts and a negative control grid voltage of approximately 5 volts; it draws approximately 20 milliamperes from anode battery 25 when the transmitter is coupled to the antenna. The anode current reduces by approximately 4 milliamperes when the antenna is removed. There is no tendency for the transmitter to conduct excessive anode current when operated without an antenna. The frequency of the carrier oscillator does not vary by more than one-half of one percent between the loaded and unloaded conditions.

Figs. 6, 6-A, 6-B and 7 show a preferred arrangement of the capacitors and other parts not formed by etched circuitry on the base 60. It should be noted that the relay 21 is anchored to one corner of the base; it is provided with a dust shield or cover 87, see Fig. 6-B. However, this relay can be placed at any other suitable location in the circuit since it is not necessary that it be mounted on said base. In these figures, parts which have been previously described in connection with Figs. 1 to 5, inclusive, are given corresponding reference numerals.

A transmitter made on a mass production basis in accordance with the instant invention, has a weight of approximately six ounces with all parts fully assembled on the base member, the latter having a dimension of approximately four and one-half by three and one-half inches. Furthermore, the transmitter has good electrical and mechanical stability while operating on a carrier wave of 403 megacycles. The base member with its particular arrangement of etched copper-clad circuitry, may be readily produced in large quantities, substantially ready for assembly of the component parts thereto. Since a major part of the capacitors along with the aerial tank circuit are provided by the prefabricated base member, wiring operations are reduced to a minimum.

It will be apparent that once the concepts of the invention become known to those skilled in the art, they may be readily embodied in transmitters other than the specific form herein illustrated and described without the exercise of the inventive faculties.

What is claimed and desired to be secured by United States Letters Patent is:

1. In a telemetering device, a mounting base having dielectric properties and being of a thickness to function as a capacitor dielectric, a radio frequency oscillator comprising an electric discharge device and an external oscillation circuit including a transmission line of a given wave length having a pair of resonant sections made up of a coating of conductive material of a predetermined effective area applied to said base, said sections being open at the high-voltage end of the transmission line and short-circuited at the opposite low-voltage end thereof, said electric discharge device having an anode connected in feed-back relation to one of said sections at the open end of the line and a control grid, and means coupling said grid to said line, said coupling means including a conductor of predetermined length comprised principally of a coating of conductive material of a given effective area extending substantially parallel to but slightly spaced from the other of said resonant sections from the open high voltage end to the low voltage shorted extremity of the transmission line and a connection from the low voltage end of said coupling coating to ground.

2. In a telemetering device, a mounting base having dielectric properties and being of a thickness to function as a capacitor dielectric, a radio frequency oscillator comprising an electric discharge device and an external oscillation circuit including a transmission line of a given wave length having a pair of resonant sections made up of a coating of conductive material of a predetermined effective area applied to one side of said base, said sections being open at the high-voltage end of the transmission line and short-circuited at the opposite low-voltage end thereof, said electric discharge device having an anode connected in feed-back relation to one of said sections at the open end of the line and a control grid, means coupling said grid to said line including a conductor of predetermined length comprised principally of a conductive coating having a given effective area extending substantially parallel to but slightly spaced from the other of said resonant sections from the open high voltage end to the low voltage shorted extremity of the transmission line, a capacitor element in the form of a coating of conductive material applied to said base on the side opposite said coupling conductor, an antenna bracket also secured to the latter side of said base opposite said other resonant section, said coupling conductive coating and said capacitor element functioning as one part of a large coupling capacitance and said other of said resonant sections of the transmission line and said antenna bracket functioning as the other part of said coupling capacitance, and a connection from the low voltage end of said coupling coating to ground.

References Cited in the file of this patent

UNITED STATES PATENTS

| | | |
|---|---|---|
| 2,219,648 | Gutton et al. | Oct. 29, 1940 |
| 2,474,988 | Sargrove | July 5, 1949 |
| 2,558,343 | Cosby | June 6, 1951 |
| 2,604,582 | Hauck et al. | July 22, 1952 |
| 2,695,963 | Thias | Nov. 30, 1954 |